(12) United States Patent
McClurg et al.

(10) Patent No.: US 11,338,629 B2
(45) Date of Patent: May 24, 2022

(54) TIRE PRESSURE MONITOR WITH VARIABLE ANGLE MOUNTING

(71) Applicant: SENSATA TECHNOLOGIES, INC., Attleboro, MA (US)

(72) Inventors: David H. McClurg, County Down (GB); Thomas J. O'Brien, Randalstown (GB)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 0 days.

(21) Appl. No.: 17/074,296

(22) Filed: Oct. 19, 2020

(65) Prior Publication Data

US 2021/0031572 A1 Feb. 4, 2021

Related U.S. Application Data

(63) Continuation of application No. 16/119,109, filed on Aug. 31, 2018, now Pat. No. 10,807,421.

(60) Provisional application No. 62/712,660, filed on Jul. 31, 2018.

(51) Int. Cl.
*B60C 23/04* (2006.01)
(52) U.S. Cl.
CPC ................ *B60C 23/0494* (2013.01)
(58) Field of Classification Search
CPC ............ B60C 23/0494; B60C 23/0408; B60C 23/0498
See application file for complete search history.

(56) References Cited

U.S. PATENT DOCUMENTS

| | | | |
|---|---|---|---|
| 5,119,066 A * | 6/1992 | Ballyns | B60C 23/0408 116/34 R |
| 5,956,820 A * | 9/1999 | Albinski | B60C 23/0408 24/455 |
| 6,952,955 B1 | 10/2005 | Uleski | |
| 7,021,133 B1 | 4/2006 | Hsu | |
| 7,040,155 B1 * | 5/2006 | Lundell | B60C 23/0408 73/146.8 |
| 7,178,390 B1 | 2/2007 | Kalovsky et al. | |
| 7,536,904 B1 | 5/2009 | Yu | |
| 8,234,919 B2 | 8/2012 | Arnoldo et al. | |
| 8,839,667 B2 | 9/2014 | Kempf | |
| 8,919,190 B2 | 12/2014 | Yu et al. | |
| 2003/0066343 A1 | 4/2003 | Fischer et al. | |

(Continued)

FOREIGN PATENT DOCUMENTS

| | | |
|---|---|---|
| EP | 1433625 A1 | 6/2004 |
| WO | 2016008091 A1 | 1/2016 |

OTHER PUBLICATIONS

Great Britain International Search Report for Application No. GB1910564.2; dated Jan. 15, 2020; 3 pages.

*Primary Examiner* — David J Bolduc
(74) *Attorney, Agent, or Firm* — Mark H. Williams

(57) ABSTRACT

A tire monitoring system with mounting features on a housing provide for positioning through a wide range of angles. Accordingly, the system can be positioned on a variety of wheel rim/valve combinations. The tire monitoring apparatus includes two opposed wings provided on the housing to facilitate the range of positioning angles at which the housing can be positioned with respect to a valve base. Each opposed wing has a same exterior surface radius of curvature and the wings are clamped between a base plate and a clamp plate at the desired angle.

21 Claims, 13 Drawing Sheets

(56) References Cited

U.S. PATENT DOCUMENTS

| | | | |
|---|---|---|---|
| 2004/0034454 A1 | 2/2004 | Ito et al. | |
| 2004/0119584 A1 | 6/2004 | Kayukawa | |
| 2005/0087228 A1 | 4/2005 | Uleski | |
| 2005/0087229 A1 | 4/2005 | Uleski | |
| 2006/0272402 A1 | 12/2006 | Yin et al. | |
| 2007/0295076 A1 | 12/2007 | Blossfeld et al. | |
| 2008/0094196 A1 | 4/2008 | Liao | |
| 2008/0121032 A1 | 5/2008 | Qiu et al. | |
| 2008/0127724 A1 | 6/2008 | Qiu et al. | |
| 2008/0250852 A1 | 10/2008 | Capdepon et al. | |
| 2008/0302425 A1 | 12/2008 | Hettle et al. | |
| 2009/0206294 A1 | 8/2009 | Yu | |
| 2009/0223570 A1 | 9/2009 | Yu | |
| 2010/0064792 A1 | 3/2010 | Chuang et al. | |
| 2011/0272038 A1 | 11/2011 | Falkenborg | |
| 2011/0315238 A1 | 12/2011 | Li | |
| 2012/0017672 A1 | 1/2012 | Uh et al. | |
| 2012/0118057 A1 | 5/2012 | Rigney et al. | |
| 2012/0204634 A1 | 8/2012 | Yu et al. | |
| 2012/0304755 A1 | 12/2012 | Chuang et al. | |
| 2012/0312089 A1 | 12/2012 | Li | |
| 2014/0159889 A1 | 6/2014 | Kanenari | |
| 2014/0331759 A1 | 11/2014 | Chen | |
| 2015/0013444 A1 | 1/2015 | Markert | |
| 2015/0090024 A1 | 4/2015 | Huang | |
| 2015/0090025 A1 | 4/2015 | Huang | |
| 2015/0183278 A1 | 7/2015 | Jankowski et al. | |
| 2017/0267038 A1 | 9/2017 | Li et al. | |
| 2019/0270351 A1 | 9/2019 | Peedikakkandy et al. | |

* cited by examiner

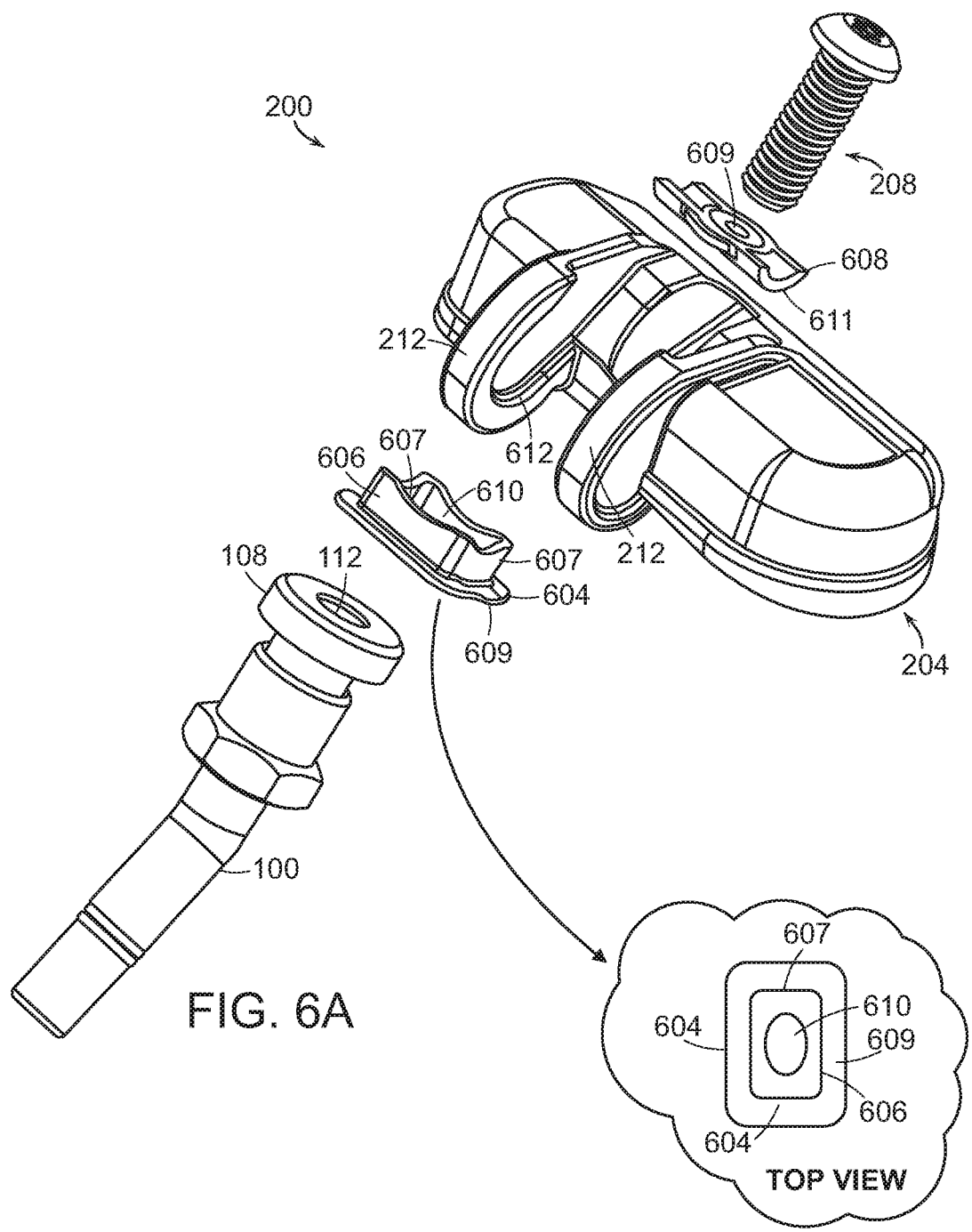

TIRE PRESSURE MONITOR WITH VARIABLE ANGLE MOUNTING

RELATED APPLICATION

This application is a continuation of and claims priority from U.S. Pat. No. 10,807,421, issued Oct. 20, 2020, which is a non-provisional patent application claiming priority to U.S. Provisional Patent Application No. 62/712,660, filed Jul. 31, 2018.

FIELD OF THE INVENTION

The disclosure relates to a pressure monitor used in a Tire Pressure Monitoring System (TPMS).

BACKGROUND OF THE INVENTION

As is known, a tire pressure monitoring system (TPMS) includes a wheel electronics module for housing a pressure measuring device and a transmission device. In known systems, for example, as shown in U.S. Pat. No. 8,234,919, the pressure measuring housing is attached to a tire valve and installed inside the tire to be monitored. The housing is shaped to be adjacent to, i.e., rest on, an interior rim well.

It is important that the housing be adjacent the interior wheel rim well for reliability purposes among other reasons. An issue arises, however, with respect to the differing geometries of the interior rim well of various wheels. In addition, there are differently shaped tire valves for various tire and wheel combinations. Accordingly, the valve and wheel geometries may combine to prevent the wheel electronics module from being able to contact the interior rim well.

What is needed is a better tire pressure measuring assembly.

SUMMARY

In one aspect of the present disclosure, a TPMS includes mounting features that allow a sensor housing to be positioned at an angle within a wide range of possible angles. Advantageously, the housing can be positioned on an extensive range of wheel rim/valve combinations because of the adjustability of the design. This flexibility reduces the number of different assemblies necessary to equip wheels with sensing functions.

In one aspect of the present disclosure, a tire monitoring system comprises a housing; a mounting structure disposed on the housing; and a clamp assembly configured to couple to the mounting structure and to a tire valve, to maintain the housing at an angle, with respect to the tire valve, within a predetermined range of angles.

In another aspect of the disclosure, the mounting structure may comprise first and second mounting wings provided on the housing, each wing including a respective inner ledge of a first radius of curvature value and a respective exterior surface of a second radius of curvature value. The clamp assembly may comprise: a threaded screw; a base plate having a first surface with a flat peripheral area defined on the first surface, a flat second surface and an opening defined in the base plate from the first surface to the second surface; and a clamp plate having a first convex surface with the first radius of curvature value, a second surface and an opening defined in the clamp plate from the first surface to the second surface.

In another aspect of the disclosure, the mounting structure may comprise first and second mounting flanges provided on the housing, each mounting flange having a respective exterior surface with a first radius of curvature value and a respective interior curved surface of a second radius of curvature value, and the clamp assembly may comprise: a semi-round threaded screw having a screw head with the second radius of curvature value; and a base support having a first concave surface with the first radius of curvature value, a flat second surface and an opening defined in the base support from the first surface to the second surface.

In another aspect of the disclosure, the mounting structure may comprise: first and second mounting loops provided on the housing, each mounting loop having a respective exterior surface portion with a first radius of curvature value and a respective interior surface portion with a second radius of curvature value, and the clamp assembly may comprise: a threaded screw; a base support having a first concave surface with the first radius of curvature value, a flat second surface and an opening defined in the base support from the first surface to the second surface; and a coupling portion having a first convex surface with the second radius of curvature, a second surface and an opening defined in the coupling portion from the first surface to the second surface.

In another aspect of the disclosure, a kit for installing a tire monitoring system in a wheel rim comprises: a tire monitoring system, comprising a housing; a mounting structure disposed on the housing; and a clamp assembly configured to couple to the mounting structure and to a tire valve. A set of instructions for installing the tire monitoring system in a wheel rim comprises: positioning, in the wheel rim, a tire valve having a valve stem at a distal end and a threaded opening at a proximal end; coupling the clamp assembly to the mounting structure; coupling the clamp assembly to the proximal end of the tire valve; positioning the housing at an angle with respect to the tire valve; and setting the clamp assembly to maintain the angle of the housing with respect to the tire valve.

In another aspect of the disclosure, a method of installing a tire monitoring system in a wheel rim comprises: providing a tire monitoring system, comprising: a housing; a mounting structure disposed on the housing; and a clamp assembly; and installing the tire monitoring system in the wheel rim by: positioning, in the wheel rim, a tire valve having a valve stem at a distal end and a threaded opening at a proximal end; coupling the clamp assembly to the mounting structure; coupling the clamp assembly to the proximal end of the tire valve; positioning the housing at an angle with respect to the tire valve; and setting the clamp assembly to maintain the angle of the housing with respect to the tire valve.

BRIEF DESCRIPTION OF THE DRAWINGS

One or more aspects of the present disclosure are discussed below with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended to be limiting. In the Figures:

FIG. 6A is an exploded view of the tire monitoring apparatus of FIG. 2;

FIG. 6B is a top view of a component of the tire monitoring apparatus of FIG. 2;

DETAILED DESCRIPTION

U.S. Provisional Patent Application No. 62/712,660, filed Jul. 31, 2018, entitled "Tire Pressure Monitor With Variable Angle Mounting" is herein incorporated by reference in its entirety for all purposes.

In the following detailed description, numerous specific details are set forth in order to provide a thorough understanding of the aspects and implementations of the present disclosure. It will be understood by those of ordinary skill in the art that these may be practiced without some of the specific details that are set forth. In some instances, well-known methods, procedures, components and structures may not have been described in detail so as not to obscure the details of the implementations of the present disclosure.

Generally, various aspects of the present disclosure provide for, among others, a TPMS with mounting features that are adjustable through a wide range of angles. Advantageously, the housing can be positioned on an extensive range of wheel rim/valve combinations because of the adjustability of the design, as will be described below in more detail.

Figures 1A, 1B:
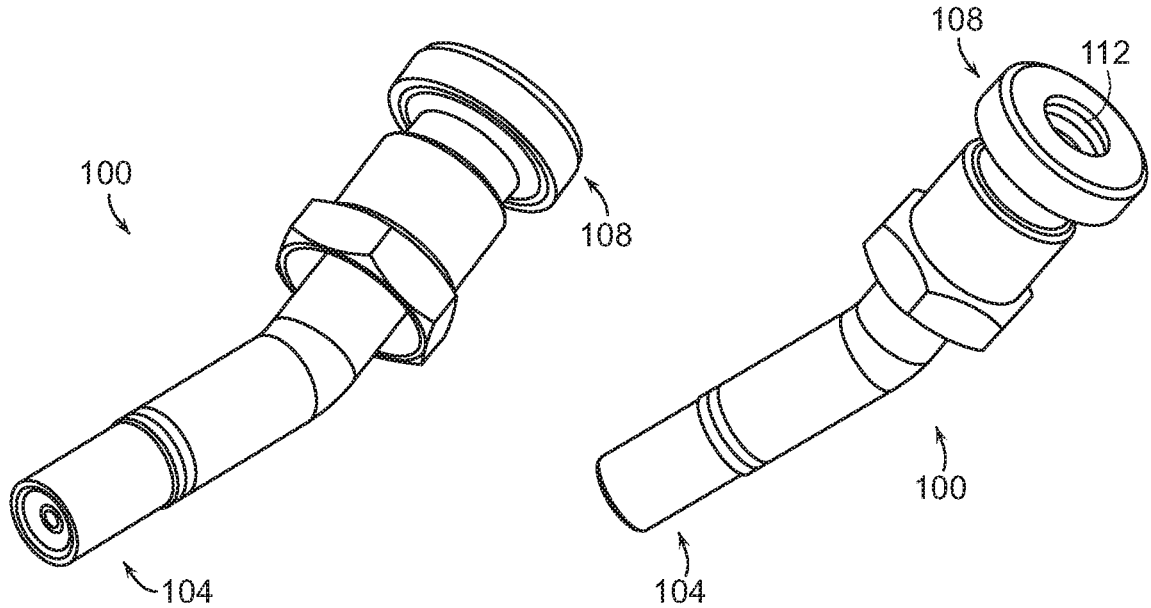
FIGS. 1A-1C are representations of a known tire valve.
Figure 1C:
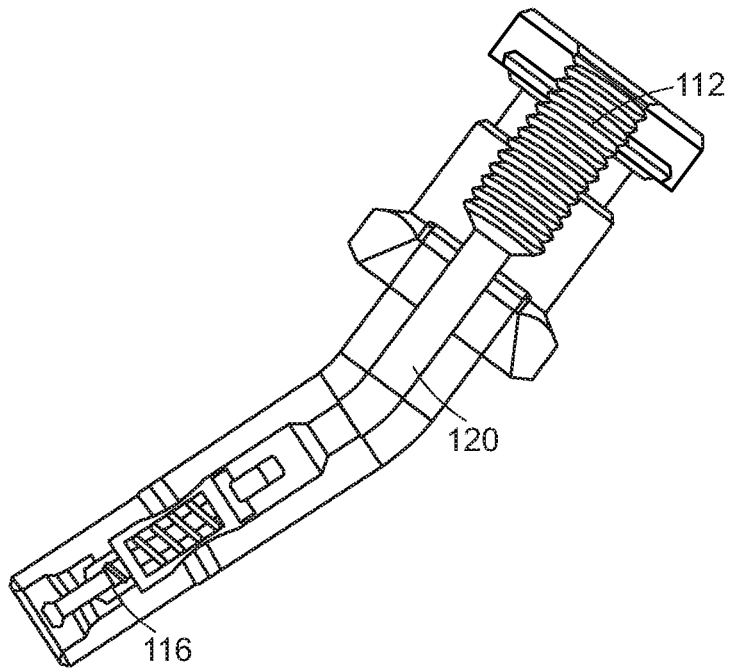
Figure 2:
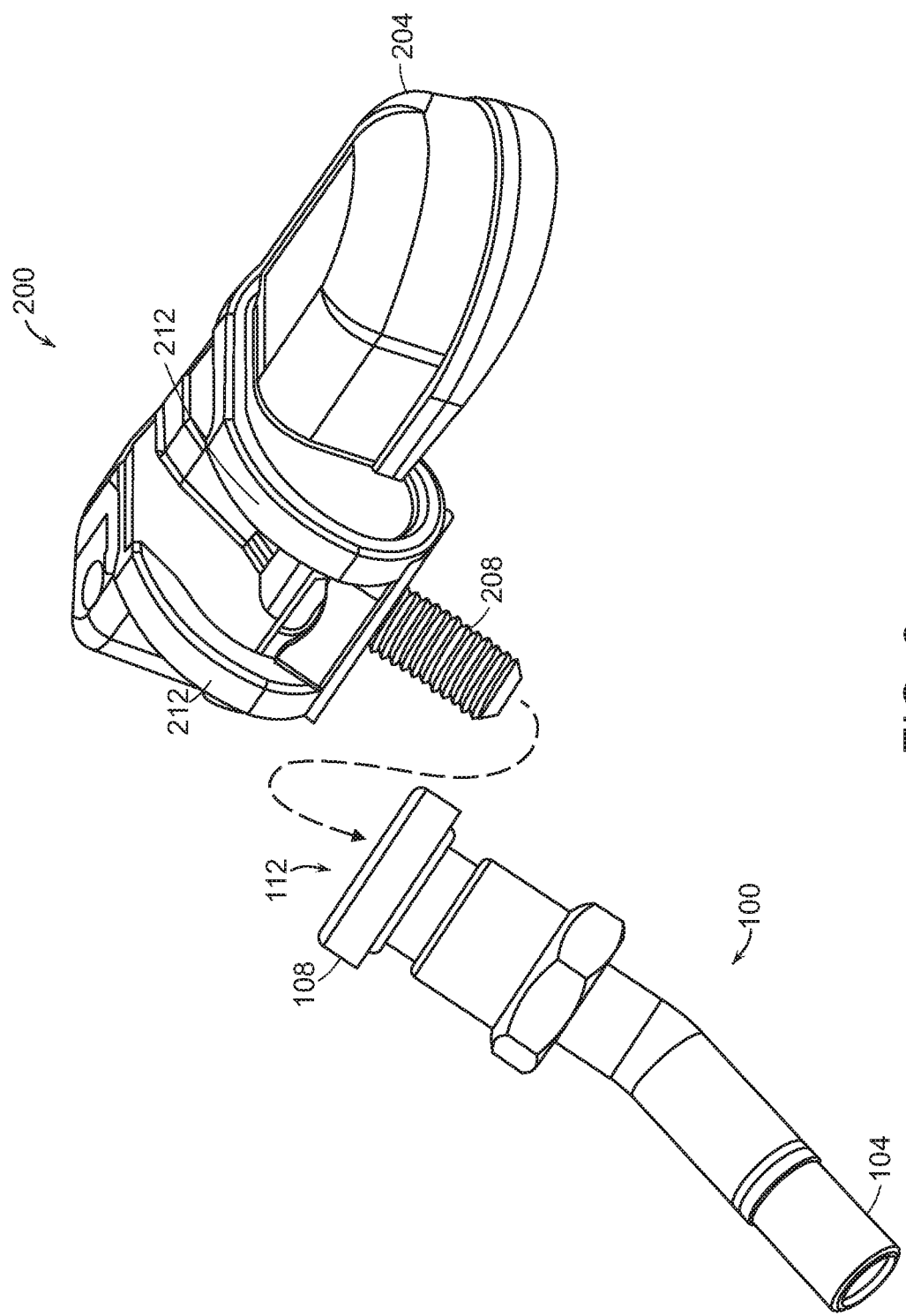
FIG. 2 is a tire monitoring apparatus in accordance with an aspect of the present disclosure.

Referring now to FIGS. 1A-1C, a known tire valve 100 includes a stem 104 and a valve base 108. The stem 108 is the portion that is visible outside the tire and through which air is provided to fill the tire. The valve base 108 is in the interior of the tire and includes a threaded portion 112, as shown in FIG. 1B. As shown in FIG. 1C, a fill assembly 116 provides for fluid connection of a pump, not shown, to the threaded portion via a conduit or lumen 120 defined within the valve 100.

In accordance with an aspect of the present disclosure, as shown in FIGS. 2-5, a tire monitoring apparatus 200 includes a sensor housing 204 in which one or more sensors, for example, but not limited to, pressure and temperature, and wireless communications devices, are provided. A threaded screw 208 couples the sensor housing 204 to the threaded portion 112 of the valve 100. Two opposed wings 212 are provided on the sensor housing 204, as components of a mounting structure, to facilitate a range of angles at which the sensor housing 204 can be positioned with respect to the valve base 108. Each opposed wing 212 has a same exterior surface radius of curvature.

The tire monitoring apparatus 200, see FIGS. 6A and 6B, includes the screw 208, a base plate 604, and a clamp plate 608. The screw 208, base plate 604, and the clamp plate 608 are components of a clamp assembly to couple to the valve and the mounting structure components. The clamp plate includes a convex surface 611. Each of the base plate 604 and the clamp plate 608 has a respective hole 609, 610 defined such that the holes 609, 610 are concentrically aligned when the base plate 604 and the clamp plate 608 are arranged together. The base plate 604 includes a raised stand 606 having opposed concave surfaces 607. Each concave surface 607 has a same radius of curvature. The raised stand 606 is positioned on the base plate 604 such that a perimeter surface 609 is defined.

In operation, the wings 212 are positioned on the perimeter surface 609 with the raised stand 606 positioned between the wings 212. The clamp plate 608 is then positioned between the wings 212 to couple to a respective ledge 612 of each wing 212. The ledge 612, convex surface 611 and the concave surfaces 607 are all of the same radius of curvature. The wing 212 is then captured between the base plate 604 and the clamp plate 608 when the housing 204 is screwed onto the valve base 108 by the screw 208.

Figure 7A:
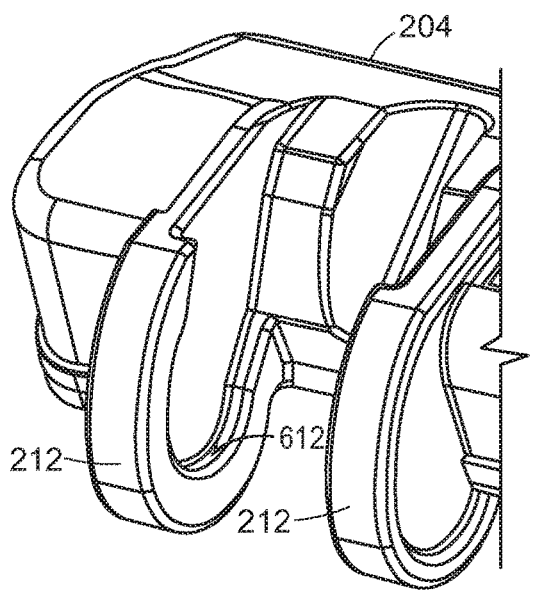
FIGS. 7A-7C represent the installation of the tire monitoring system of FIG. 2.
Figure 7B:
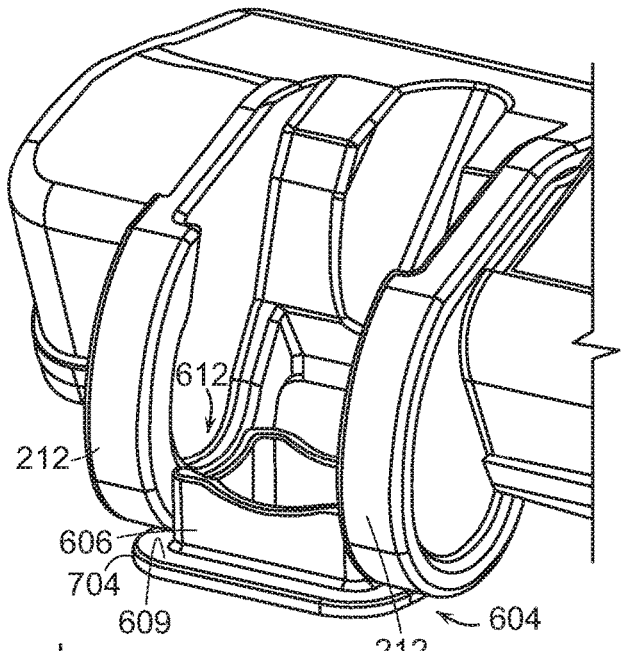
Figure 7C:
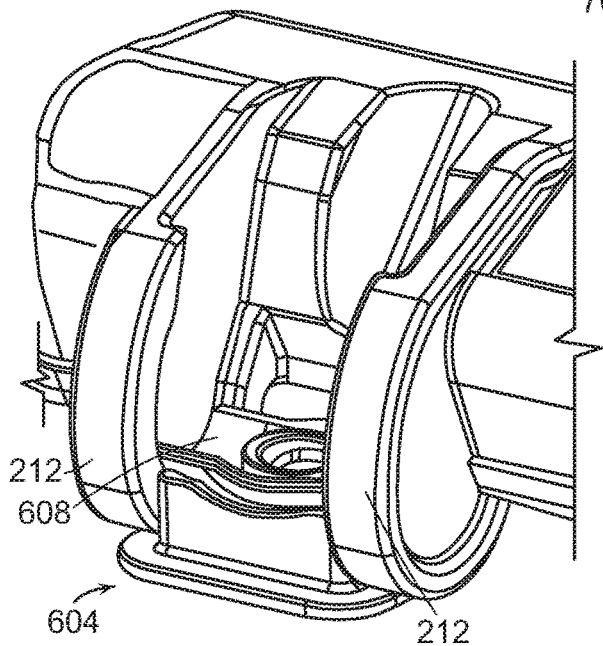

As shown in FIGS. 7A-7C, the base plate 604 includes a flat surface 704 to couple to the valve base 108. The raised stand 606 is positioned between the two wings 212 when placed on the periphery 609 adjacent the raised stand 606, as shown. The clamp plate 608 is positioned between the two wings 212 to capture the ledges 612, as can be seen in FIG. 7C.

Figure 8:
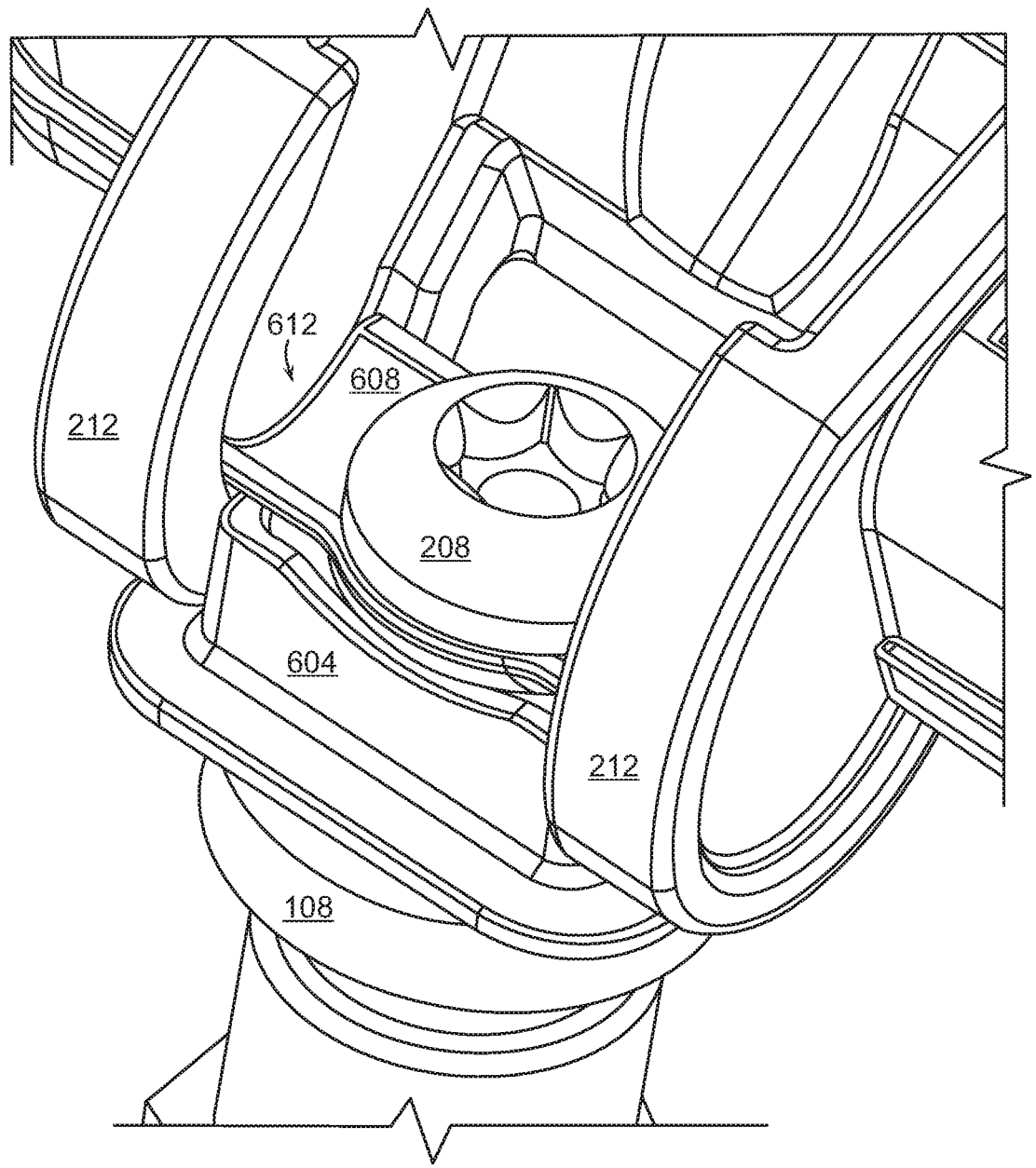
FIG. 8 is a close-up representation of the tire monitoring system of FIG. 2.

The screw 208 is then positioned through the concentrically aligned holes 609, 610 and into the threaded portion 112 of the valve 100 to clamp the wings 212 in place as can be seen in FIG. 8.

Figure 3:
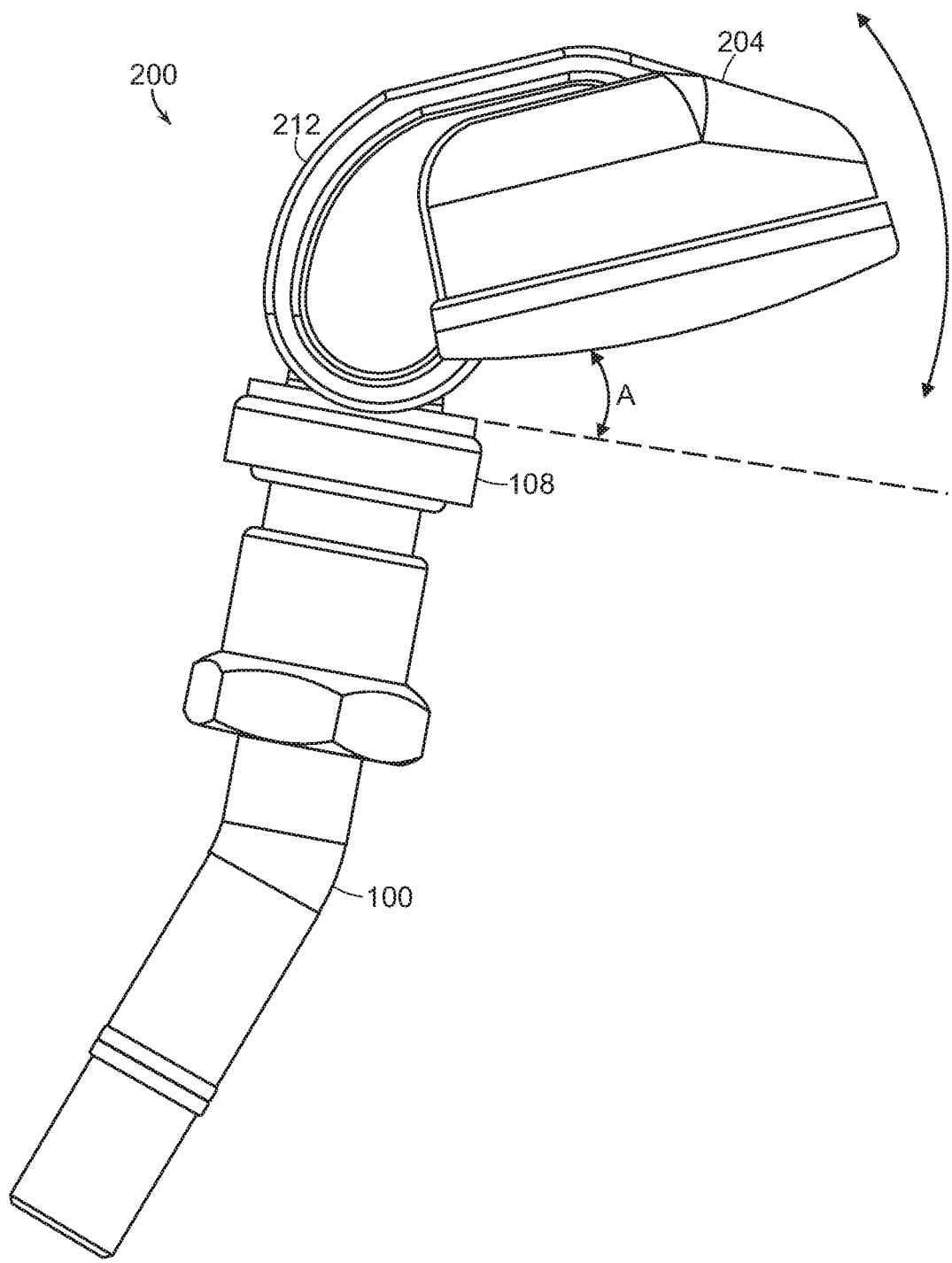
FIG. 3 is a side view of the tire monitoring apparatus of FIG. 2.
Figure 4:
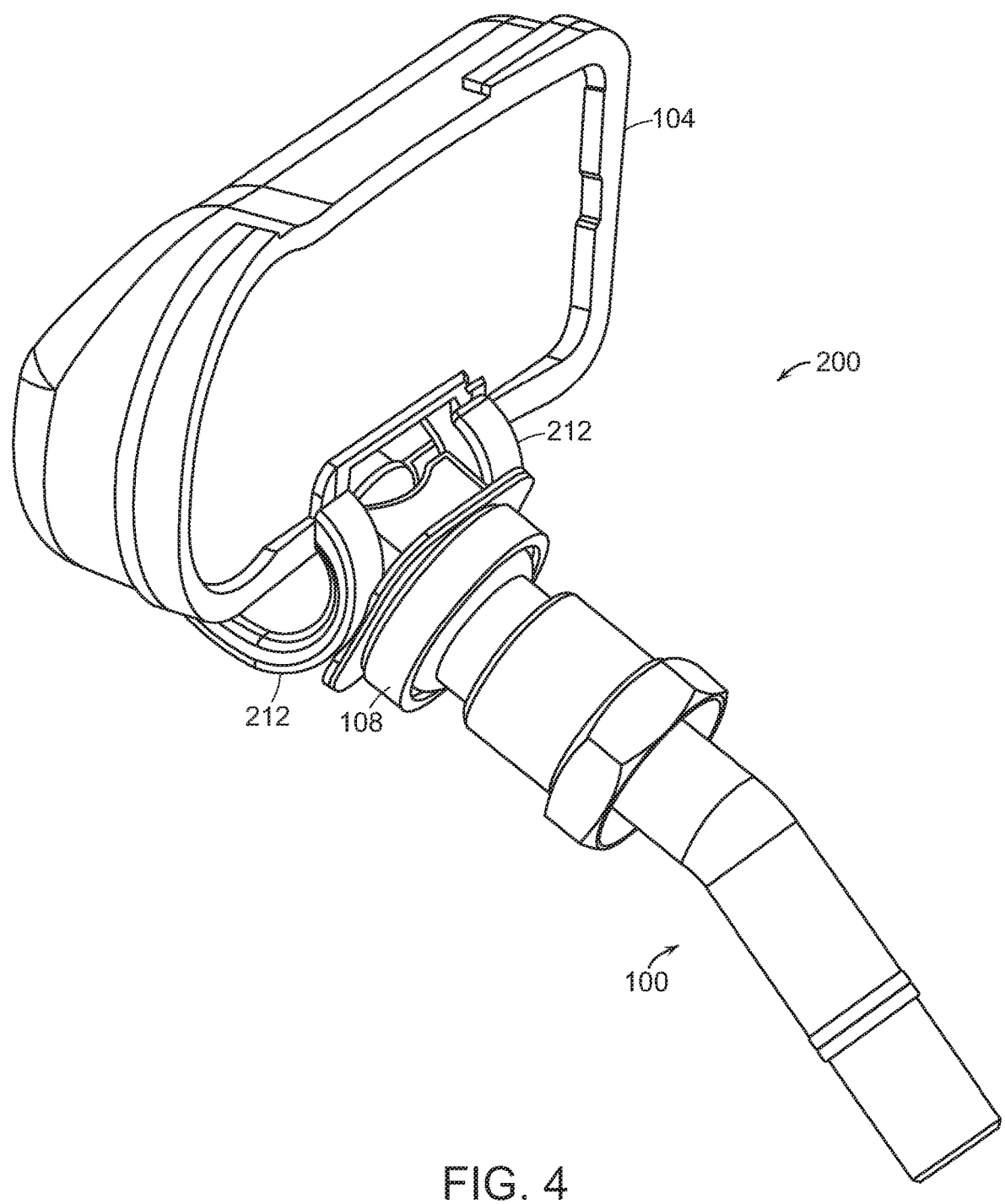
FIG. 4 is a view of an underside of the tire monitoring apparatus of FIG. 2.
Figure 5:
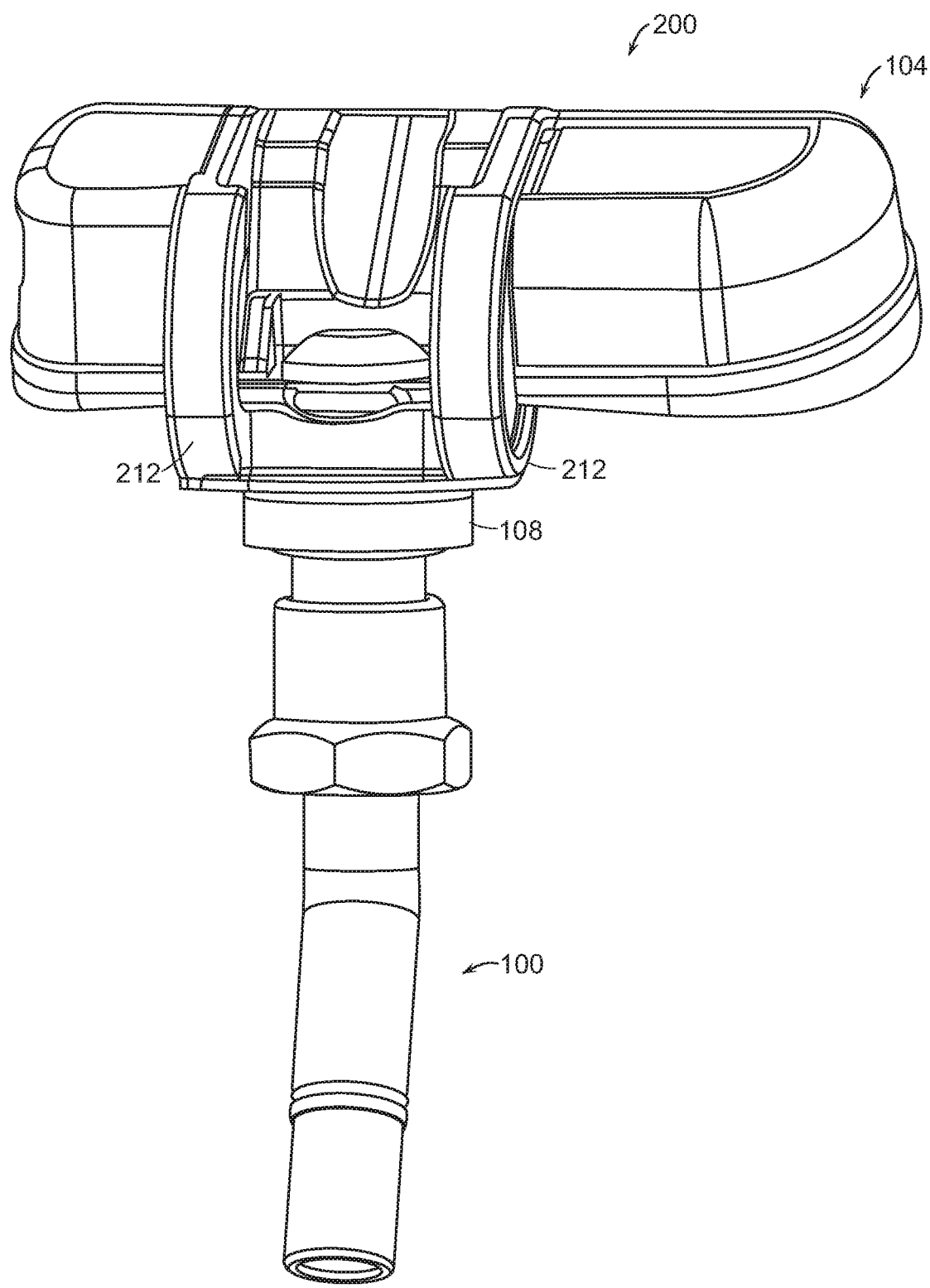
FIG. 5 is another view of the tire monitoring apparatus of FIG. 2.

Advantageously, with the ledge 612, convex surface 611 and the concave surfaces 607 all having the same radius of curvature, an angle A of the housing 204 can be set when the screw 208 is tightened down, see FIG. 3. The housing angle A is set so that the housing 204 rests on an inner well area of the tire.

Generally, the housing 204 may be made of a plastic or other material sufficient to withstand the conditions within a tire in order to protect any devices in the housing 204 from being damaged. The wings 212 may be made from the same material as the housing 204 and may be reinforced to withstand any forces from operation of the tire in addition to the compression forces of the clamp plate 608 and the base plate 604, each of which may be made of a metal, for example, aluminum or stainless steel.

Figure 9A:
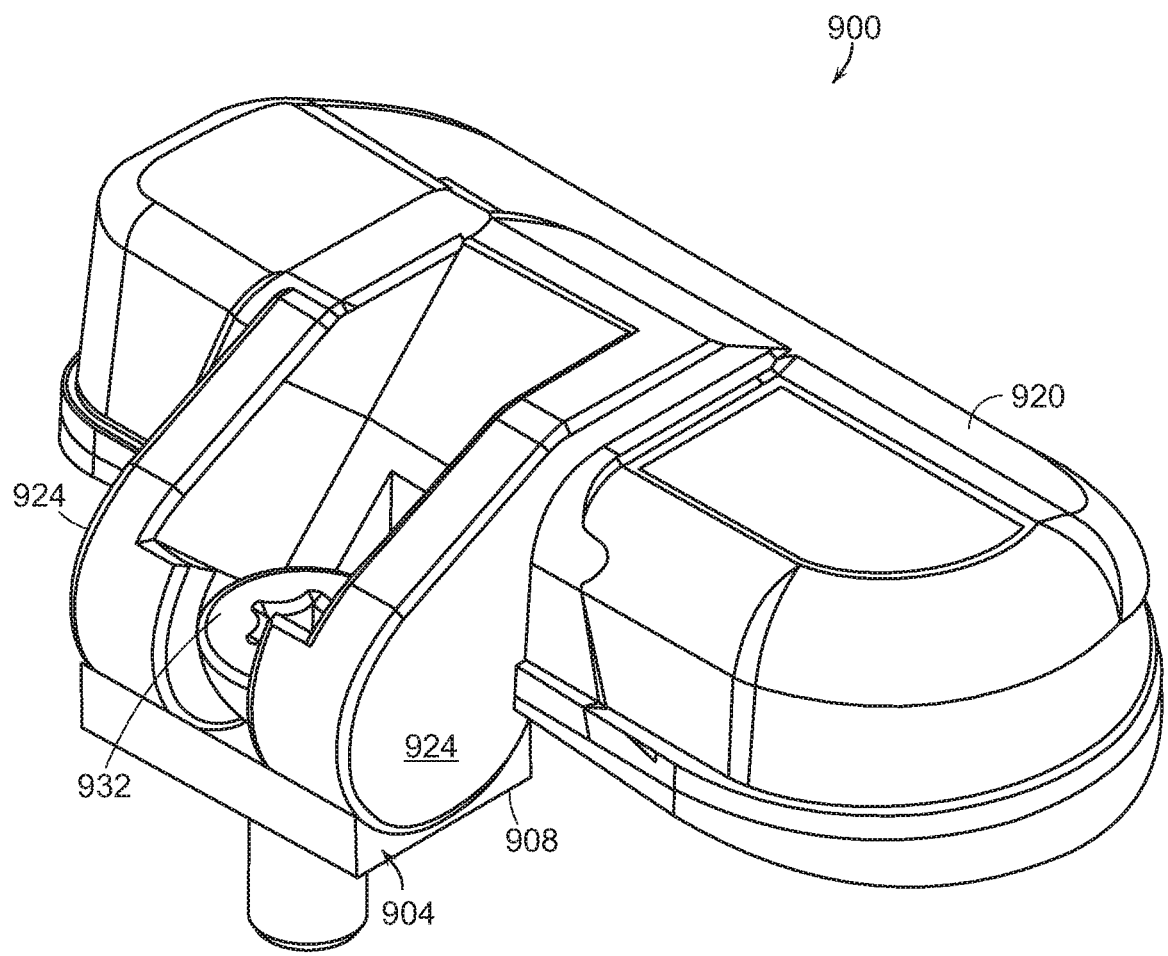
FIG. 9A is a tire monitoring apparatus in accordance with another aspect of the present disclosure.
Figure 9B:
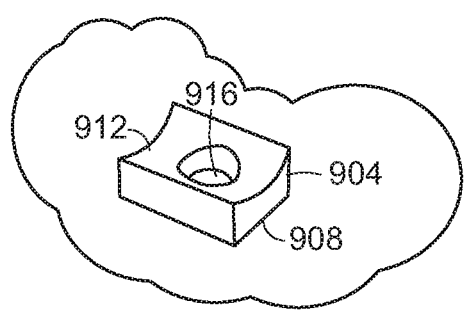
FIG. 9B is a component of the tire monitoring apparatus of FIG. 9A.
Figure 10:
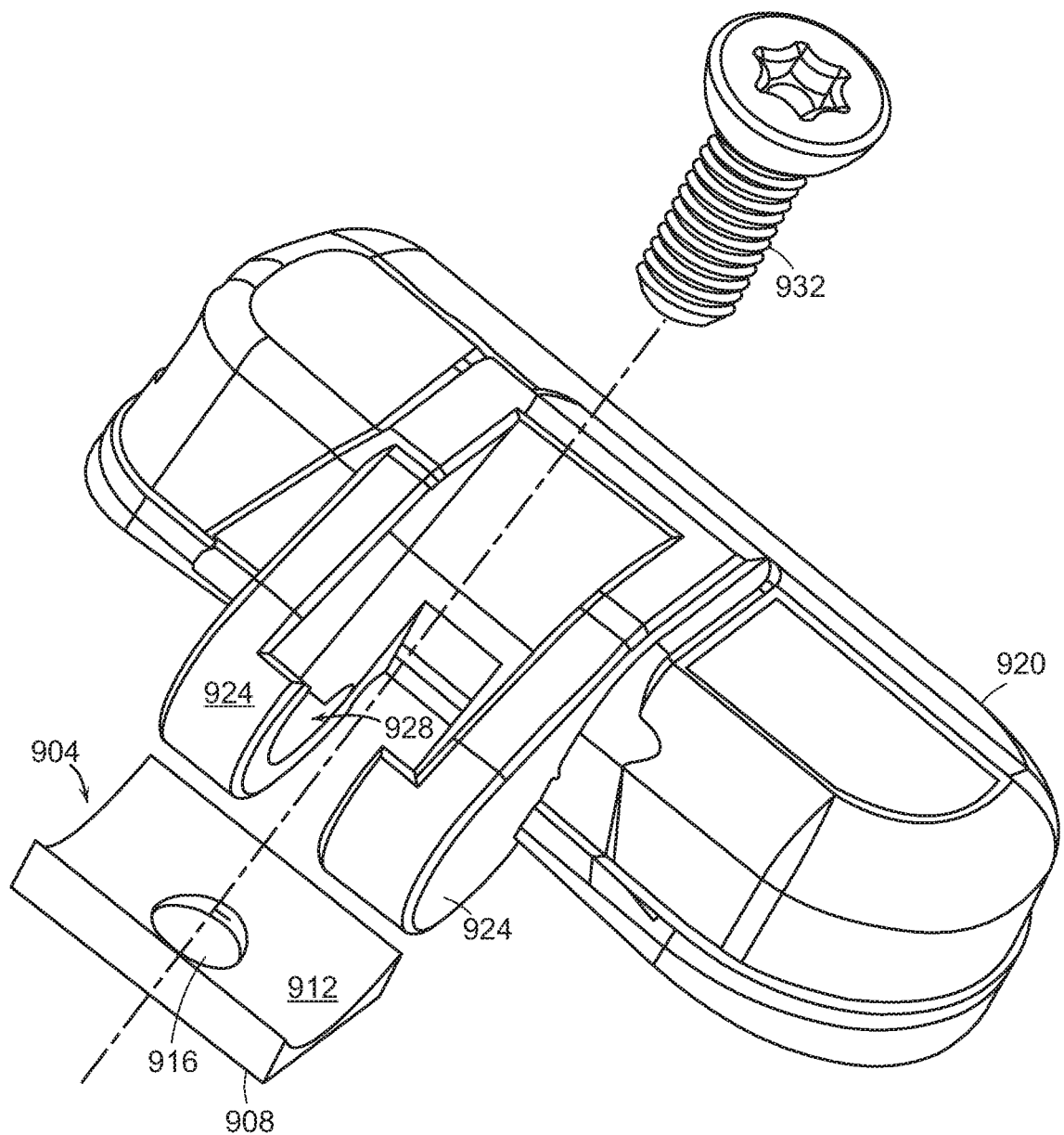
FIG. 10 is an exploded view of the tire monitoring apparatus of FIG. 9A.

A tire monitoring apparatus 900 in accordance with another aspect of the present disclosure is shown in FIGS. 9A, 9B and 10. The apparatus 900 includes a base portion 904 with a flat surface 908, an opposite curved surface 912 and a hole 916 defined there through. A housing 920 has two opposed flanges 924 extending from the housing 920, as components of a mounting structure. Each flange 924 includes a cup portion 928 with a shape corresponding to a threaded semi-round screw 932 and the flanges 924 are spaced apart a distance sufficient to capture the semi-round screw 932 between the cup portions 928 of the two flanges 924. The screw 932 and base portion are components of a clamp assembly.

The base portion 904 is positioned on the valve base 108 and the semi-round screw 932 is positioned between the flanges 924 and into the threaded portion 112. When tightened into the threaded portion 112 of the valve (not shown) the housing 920 is fixed at the desired angle.

Generally, the housing 920 may made of a plastic or other material sufficient to withstand the conditions within a tire in order to protect any devices in the housing 920 from being damaged. The flanges 924 may be made from the same material as the housing 920 and may be reinforced to withstand any forces from operation of the tire in addition to the compression forces of the base portion 904 and the semi-round screw 932, each of which may be made of a metal, for example, aluminum or stainless steel.

Figure 11:
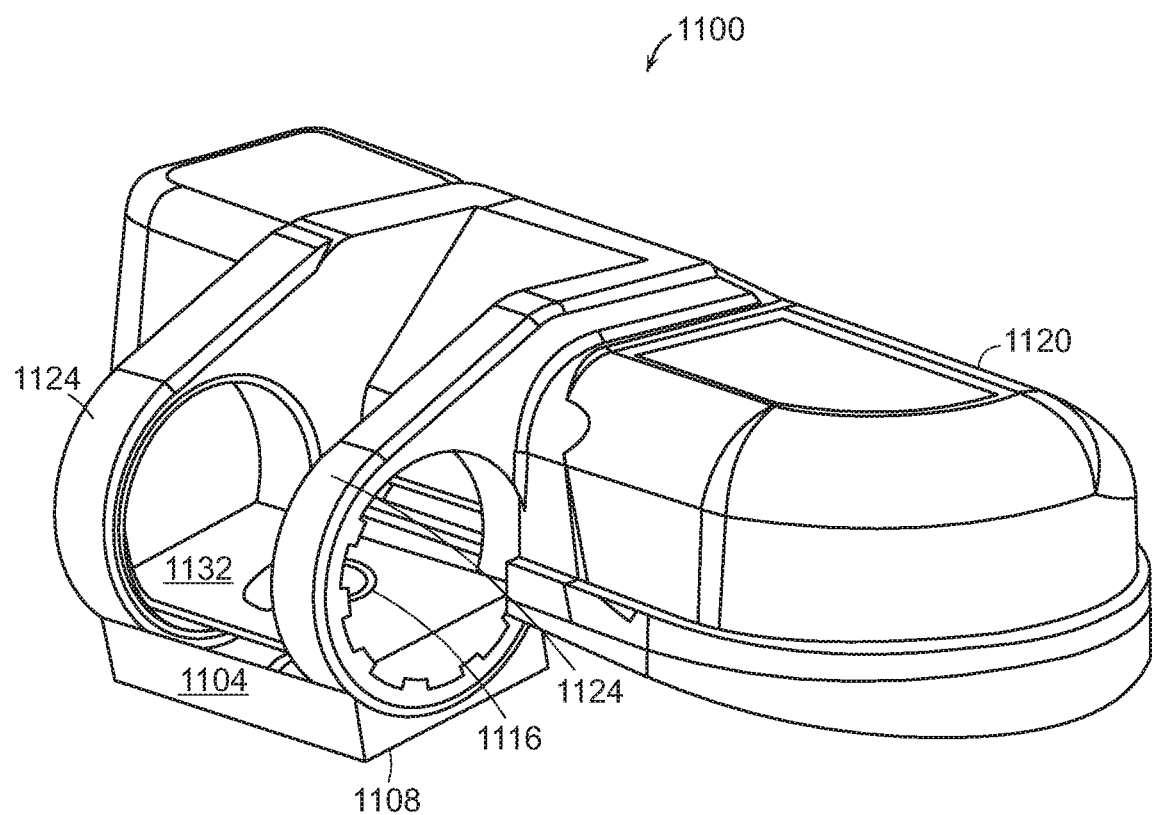
FIG. 11 is a tire monitoring apparatus in accordance with another aspect of the present disclosure.
Figure 12:
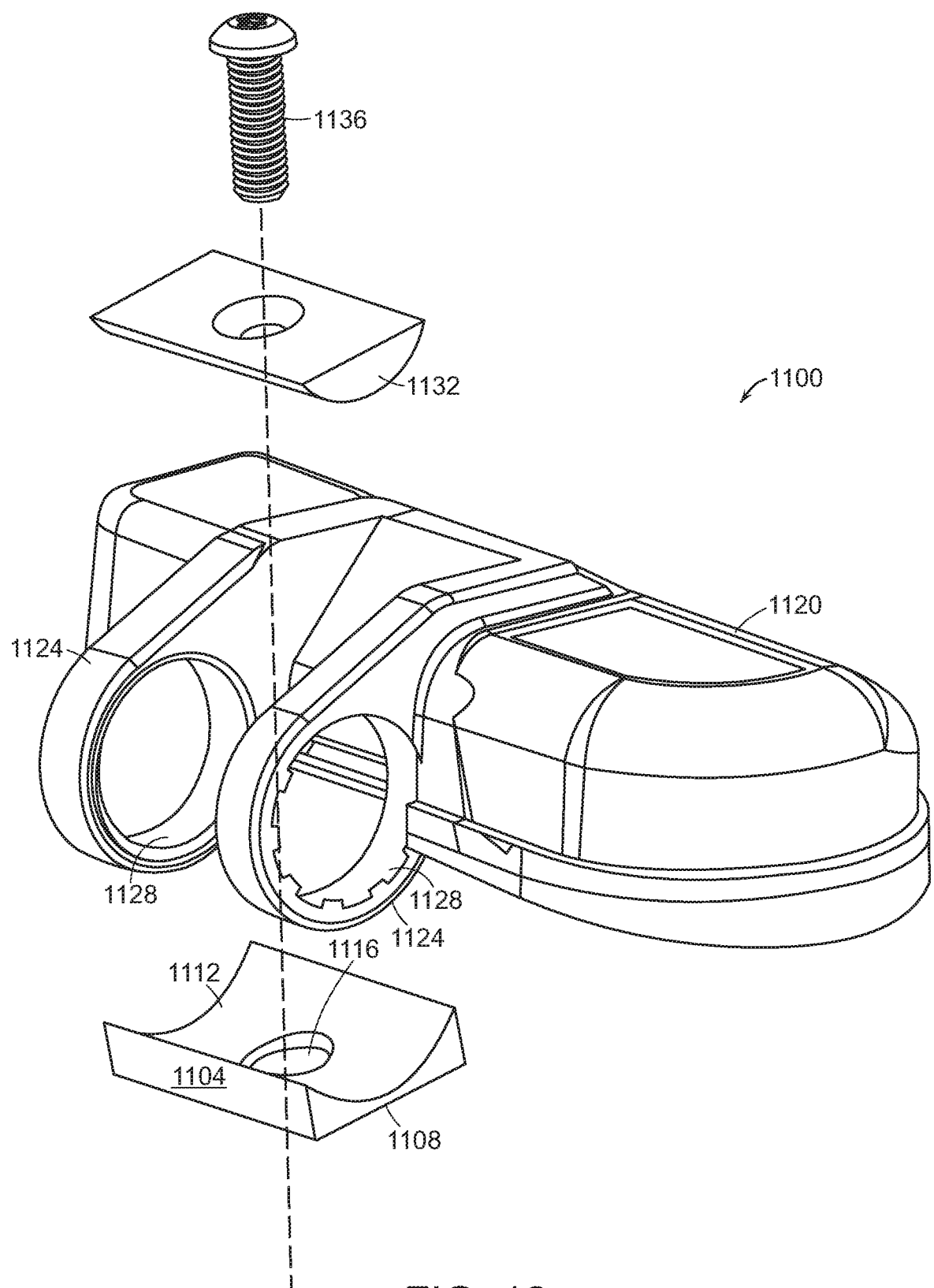
FIG. 12 is an exploded view of the tire monitoring apparatus of FIG. 11.

Referring now to FIGS. 11 and 12, another tire monitoring apparatus 1100 in accordance with another aspect of the present disclosure includes a base portion 1104 with a flat surface 1108, a curved surface 1112 and a hole 1116 defined there through. A housing 1120 has two opposed loops 1124 extending from the housing 1120 as components of a mounting structure. Each loop 1124 includes an inner rim portion 1128 with a shape corresponding to a semi-round clamp portion 1132 and the flanges 1124 are spaced apart a distance sufficient to capture the semi-round clamp portion 1132 between the two loops 1124.

The base portion 1108 is positioned on the valve base 112 and the semi-round clamp portion 1132 is positioned between the two loops 1124 and rests on the respective inner rim portion 1128. When a screw 1136 is tightened into the threaded portion 112 of the valve (not shown) the housing 1120 is fixed at the desired angle. Thus, the screw 1136, the base portion 1108 and the semi-round clamp portion 1132 are components of a clamp assembly.

Each tire monitoring apparatus may be provided in kit form where the components are provided along with instructions for attaching the tire monitoring apparatus to a tire valve assembly. The tire valve assembly might or might not be provided in the kit as the tire valve assembly may be, for example, already installed in the tire, i.e., when the tire monitoring apparatus is replacing a failed unit or when the tire valve assembly is provided separately from the tire monitoring apparatus, as would be understood by one of ordinary skill in the art.

Figure 13:
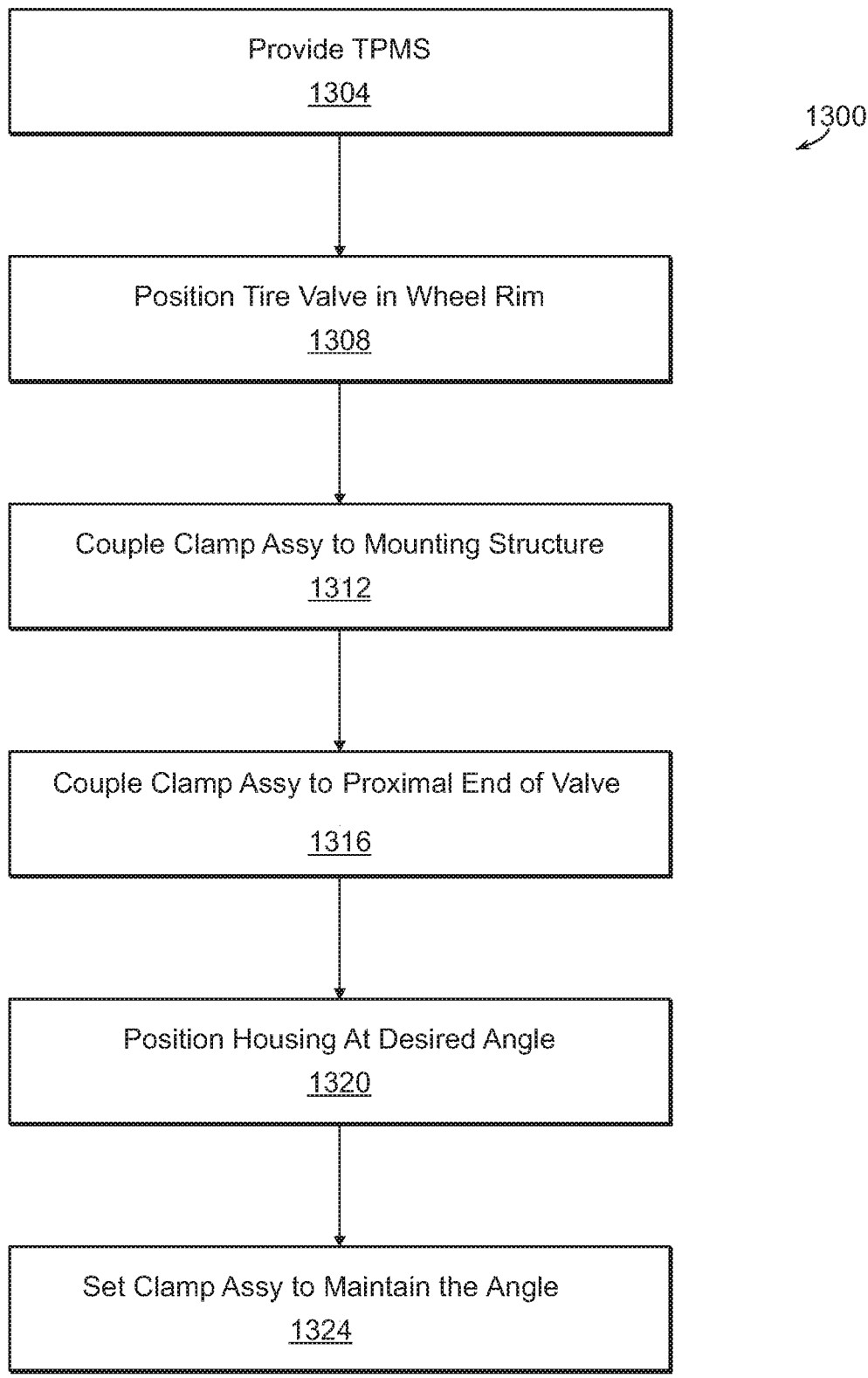
FIG. 13 is a method in accordance with an aspect of the present disclosure.

A method 1300 of installing a TPMS, as shown in FIG. 13, includes providing a TPMS, for example, any one of the systems described herein, step 1304. The tire valve is installed in the wheel rim, step 1308, and a clamp assembly of the TPMS is coupled to the mounting structure of the housing, step 1312. The clamp assembly is coupled to the proximal end of the valve, step 1316, and the housing is positioned at the desired angle, step 1320. Subsequently, the clamp assembly is set to maintain the angle at step 1324.

Thus, one exemplary kit providing the tire monitoring apparatus 200, would contain the sensor housing 204, the threaded screw 208, the base plate 604, the clamp plate 608 and a set of installation instructions.

The installation instructions provide directions for installing the apparatus 200 where the wings 212 are to be positioned on the perimeter surface 609 with the raised stand 606 positioned between the wings 212. The clamp plate 608 is then positioned between the wings 212 to couple to the respective ledge 612 of each wing 212. The clamp plate 608 is then positioned to capture each wing 212 between the base plate 604 and the clamp plate 608 and the screw 208 is provided in the concentrically aligned holes 609, 610 and screwed onto the valve base 108. The angle A is then set as determined by the inner well area of the wheel.

It is to be understood that the details of construction and the arrangement of the components set forth in the description or illustrated in the drawings are not limiting. There are other ways of being practiced or carried out. Also, it is to be understood that the phraseology and terminology employed herein are for the purpose of description only and also should not be regarded as limiting.

It is appreciated that certain features, which are, for clarity, described in the context of separate implementations, may also be provided in combination in a single implementation. Conversely, various features, which are, for brevity, described in the context of a single implementation, may also be provided separately or in any suitable sub-combination.

While various aspects have been described, it will be apparent to those of ordinary skill in the art that many more embodiments and implementations are possible and are within the scope of this disclosure.

What is claimed is:

1. A tire monitoring system, comprising:
a tire pressure sensor housing;
a mounting structure disposed on the housing, the mounting structure for coupling the tire pressure sensor housing to a tire valve at an angle, with respect to the tire valve, within a predetermined range of angles, the mounting structure including:
first and second mounting wings provided on the tire pressure sensor housing, each wing including a respective inner ledge of a first radius of curvature value and a respective exterior surface of a second radius of curvature value, the exterior surface configured for convexly facing the tire valve.

2. The system of claim 1,
further comprising a wherein the clamp assembly comprising:
a threaded screw;
a base plate having a first surface with a flat peripheral area defined on the first surface, a flat second surface and an opening defined in the base plate from the first surface to the second surface; and
a clamp plate having a first convex surface with the first radius of curvature value, a second surface and an opening defined in the clamp plate from the first surface to the second surface.

3. The system of claim 2, wherein:
the flat second surface of the base support is configured to be positioned adjacent a proximal end of the tire valve,
a respective portion of the exterior surface of each of the first and second mounting wings is configured to be positioned on a respective portion of the peripheral area of the first surface,
the clamp plate is configured to be positioned against each of the first and second wings such that a respective inner ledge of each of the first and second wings is between the clamp plate and the base plate, and
the threaded screw is configured to be provided in the openings of the base support and the clamp plate and to screw into a threaded opening of the tire valve.

4. The system of claim 2, wherein the first and second wings are parallel with, and spaced apart from, one another.

5. The system of claim 4, wherein the clamp assembly further comprises:

a raised stand, having opposed concave surfaces, disposed on the first surface of the base place, each concave surface having the first radius of curvature value, wherein the peripheral area is defined about the raised stand.

6. The system of claim 5, wherein:

the raised stand is configured to fit between the first and second wings; and a portion of each of the respective exterior surfaces of the first and second wings is configured to contact a portion of the peripheral area.

7. The system of claim 2, wherein the openings of the base support and the clamp plate are configured to be aligned with one another.

8. The system of claim 2, wherein the mounting structure comprises:

first and second mounting flanges provided on the tire pressure sensor housing, each mounting flange having a respective exterior surface with a first radius of curvature value and a respective interior curved surface of a second radius of curvature value, wherein the clamp assembly comprises:

a semi-round threaded screw having a screw head with the second radius of curvature value; and a base support having a first concave surface with the first radius of curvature value, a flat second surface and an opening defined in the base support from the first surface to the second surface.

9. The system of claim 8, wherein:

a portion of each of the respective exterior surfaces of the first and second mounting flanges is configured to be positioned against a portion of the concave surface of the base support, the semi-round threaded screw is configured to be provided in a space between the first and second flanges, in the base support opening and screwed into a threaded opening of the tire valve, and the screw head is configured to be coupled to a portion of each of the respective interior curved surfaces.

10. The system of claim 8, wherein the first and second flanges are parallel with one another.

11. The system of claim 8, wherein the first and second radius of curvature values are the same.

12. The system of claim 1, further comprising a clamp assembly comprising comprises:

a threaded screw;

a base support having a first concave surface with the first radius of curvature value, a flat second surface and an opening defined in the base support from the first surface to the second surface; and a coupling portion having a first convex surface with the second radius of curvature, a second surface and an opening defined in the coupling portion from the first surface to the second surface.

13. The system of claim 12, wherein:

the flat surface of the base support is configured to be positioned adjacent a proximal end of the tire valve, each of the first and second mounting loops is configured to be positioned against a portion of the first concave surface of the base support, the first convex surface of the coupling portion is configured to be positioned against a respective portion of the interior surfaces of each of the first and second loops such that the respective portions of the first and second loops are between the base support and the coupling portion, and the threaded screw is configured to be provided in the base support and coupling portion openings and screwed into a threaded opening of the tire valve.

14. The system of claim 12, wherein the first and second mounting loops are parallel with one another.

15. The system of claim 12, wherein the first and second radius of curvature values are the same.

16. The system of claim 12, wherein the openings of the base support and the coupling portion are configured to be aligned with one another.

17. The system of claim 1, further comprising:

the tire valve, the tire valve having a valve stem at a distal end and a threaded opening at a proximal end; and a clamp assembly comprising:

a threaded screw;

a base plate having a first surface with a flat peripheral area defined on the first surface, a flat second surface and an opening defined in the base plate from the first surface to the second surface; and a clamp plate having a first convex surface with the first radius of curvature value, a second surface and an opening defined in the clamp plate from the first surface to the second surface, wherein the flat second surface of the base support is positioned adjacent the proximal end of the tire valve, wherein a respective portion of the exterior surface of each of the first and second mounting wings is positioned on a respective portion of the peripheral area of the first surface, wherein the clamp plate is positioned against each of the first and second wings such that a respective inner ledge of each of the first and second wings is between the clamp plate and the base plate, and wherein the threaded screw is provided in the openings of the base support and the clamp plate and is screwed into the threaded opening of the tire valve.

18. The system of claim 17, wherein the clamp assembly further comprises:

a raised stand, having opposed concave surfaces, disposed on the first surface of the base place, each concave surface having the first radius of curvature value, wherein the peripheral area is defined about the raised stand.

19. The system of claim 18, wherein:

the raised stand is between the first and second wings; and a portion of each of the respective exterior surfaces of the first and second wings contacts a portion of the peripheral area.

20. The system of claim 1, further comprising:

the tire valve, the tire valve having a valve stem at a distal end and a threaded opening at a proximal end; and a clamp assembly comprising:

a semi-round threaded screw having a screw head with the second radius of curvature value; and a base support having a first concave surface with the first radius of curvature value, a flat second surface and an opening defined in the base support from the first surface to the second surface, wherein the second surface of the base support is positioned adjacent the proximal end of the tire valve, wherein a portion of each of the respective exterior surfaces of the first and second mounting flanges is positioned against a portion of the concave surface of the base support, and wherein the semi-round threaded screw is provided through the base support opening, coupled to a portion of each of the respective interior curved surfaces and is screwed into the threaded opening of the tire valve.

21. The system of claim 1, further comprising:

the tire valve, the tire valve having a valve stem at a distal end and a threaded opening at a proximal end; and a clamp assembly comprising:

a threaded screw;

a base support having a first concave surface with the first radius of curvature value, a flat second surface and an opening defined in the base support from the first surface to the second surface; and a coupling portion having a first convex surface with the second radius of curvature, a second surface and an opening defined in the coupling portion from the first surface to the second surface, wherein the flat surface of the base support is positioned adjacent the proximal end of the tire valve, wherein each of the first and second mounting loops is positioned against a portion of the first concave surface of the base support, wherein the first convex surface of the coupling portion is positioned against a respective portion of the interior surfaces of each of the first and second loops such that the respective portions of the first and second loops are between the base support and the coupling portion, and wherein the threaded screw is provided in the base support and coupling portion openings and is screwed into the threaded opening of the tire valve.

\* \* \* \* \*